United States Patent
Fetzer et al.

(10) Patent No.: US 9,475,456 B2
(45) Date of Patent: *Oct. 25, 2016

(54) BATTERY SYSTEM FOR MICRO-HYBRID VEHICLES COMPRISING HIGH-EFFICIENCY CONSUMERS

(75) Inventors: Joachim Fetzer, Bad-Ditzenbach (DE); Stefan Butzmann, Beilstein (DE); Holger Fink, Stuttgart (DE)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 882 days.

This patent is subject to a terminal disclaimer.

(21) Appl. No.: 13/575,655

(22) PCT Filed: Jan. 19, 2011

(86) PCT No.: PCT/EP2011/050673
§ 371 (c)(1),
(2), (4) Date: Jul. 27, 2012

(87) PCT Pub. No.: WO2011/092090
PCT Pub. Date: Aug. 4, 2011

(65) Prior Publication Data
US 2012/0306268 A1    Dec. 6, 2012

(30) Foreign Application Priority Data
Jan. 27, 2010  (DE) .................. 10 2010 001 243

(51) Int. Cl.
*B60R 22/00* (2006.01)
*B60R 25/00* (2013.01)
(Continued)

(52) U.S. Cl.
CPC ............... *B60R 25/00* (2013.01); *B60L 1/003* (2013.01); *B60L 11/1868* (2013.01); *H02J 1/08* (2013.01);
(Continued)

(58) Field of Classification Search
CPC .. B60R 16/033; B60R 16/03; B60L 11/1851
See application file for complete search history.

(56) References Cited

U.S. PATENT DOCUMENTS 6,222,341 B1 *  4/2001  Dougherty et al. .......... 320/104
6,806,588 B2 * 10/2004  Amano ................... B60L 11/14
                                                    307/10.7
(Continued)

FOREIGN PATENT DOCUMENTS

DE    198 46 319 C1    2/2000
DE    101 60 266 A1    6/2003
(Continued)

OTHER PUBLICATIONS

Christine Gable and Scott Gable, Reader Question: Why do Electric Cars Need to be Plugged in to Recharge?, Oct. 30, 2009, pp. 1-2 https://web.archive.org/web/20091030004601/http://alternativefuels.about.com/od/electricvehicle1/a/eleccarrechgqu.htm.*

(Continued)

*Primary Examiner* — Jared Fureman
*Assistant Examiner* — Alfonso Perez Borroto
(74) *Attorney, Agent, or Firm* — Maginot, Moore & Beck LLP

(57) ABSTRACT

A battery system for a motor vehicle includes at least one starting circuit, a low-voltage on-board supply system, and an on-board supply system with an increased voltage. The on-board supply system with increased voltage is connected to the low-voltage on-board supply system by a first coupling unit used to draw electrical energy from the on-board supply system with increased voltage and to supply said energy to the low-voltage on-board supply system. The low-voltage supply system is connected to the starter circuit by a second coupling unit used to draw electrical energy from the low-voltage on-board supply system and to supply said energy to the starter circuit.

11 Claims, 2 Drawing Sheets

(51) Int. Cl.
*B60L 1/00* (2006.01)
*B60L 11/18* (2006.01)
*H02J 1/08* (2006.01)
*H02J 7/14* (2006.01)
*H01M 10/0525* (2010.01)
*H02J 1/00* (2006.01)

(52) U.S. Cl.
CPC ......... *H02J 7/1423* (2013.01); *H01M 10/0525* (2013.01); *H02J 2001/008* (2013.01); *Y02T 10/7005* (2013.01); *Y02T 10/7011* (2013.01); *Y02T 10/7066* (2013.01)

(56) References Cited

U.S. PATENT DOCUMENTS

| | | | |
|---|---|---|---|
| 6,924,621 B2* | 8/2005 | Jabaji | H02J 7/0031 320/104 |
| 6,930,404 B1* | 8/2005 | Gale | B60L 11/1803 290/40 C |
| 7,236,893 B2* | 6/2007 | Gross et al. | 702/57 |
| 7,591,331 B2* | 9/2009 | Glonner | B60K 6/28 180/65.265 |
| 2005/0151517 A1* | 7/2005 | Cook et al. | 323/207 |
| 2006/0087778 A1* | 4/2006 | Hau et al. | 361/56 |
| 2010/0106379 A1* | 4/2010 | Soltana et al. | 701/49 |

FOREIGN PATENT DOCUMENTS

| | | |
|---|---|---|
| DE | 10 2007 048 342 A1 | 4/2009 |
| DE | 10 2007 061 562 A1 | 7/2009 |
| EP | 1 780 864 A1 | 5/2007 |
| JP | 6-504832 A | 6/1994 |
| JP | 2001-218306 A | 8/2001 |
| JP | 2003-92805 A | 3/2003 |
| JP | 2003-158830 A | 5/2003 |
| JP | 2005-533702 A | 11/2005 |
| JP | 2008230405 A * | 10/2008 |
| WO | 02/066293 A1 | 8/2002 |
| WO | 2009/047103 A1 | 4/2009 |

OTHER PUBLICATIONS

International Search Report corresponding to PCT Application No. PCT/EP2011/050673, mailed May 11, 2011 (German and English language document) (7 pages).

Su G-J et al., A Low-Cost, Triple-Voltage Bus DC-DC Converter for Automotive Applications, Applied Power Electronics Conference and Exposition, 2005. APEC 2005. Twentieth Annual IEEE Austin, TX, US, vol. 2, Mar. 6, 2005, pp. 1015-1021, XP010809360.

* cited by examiner

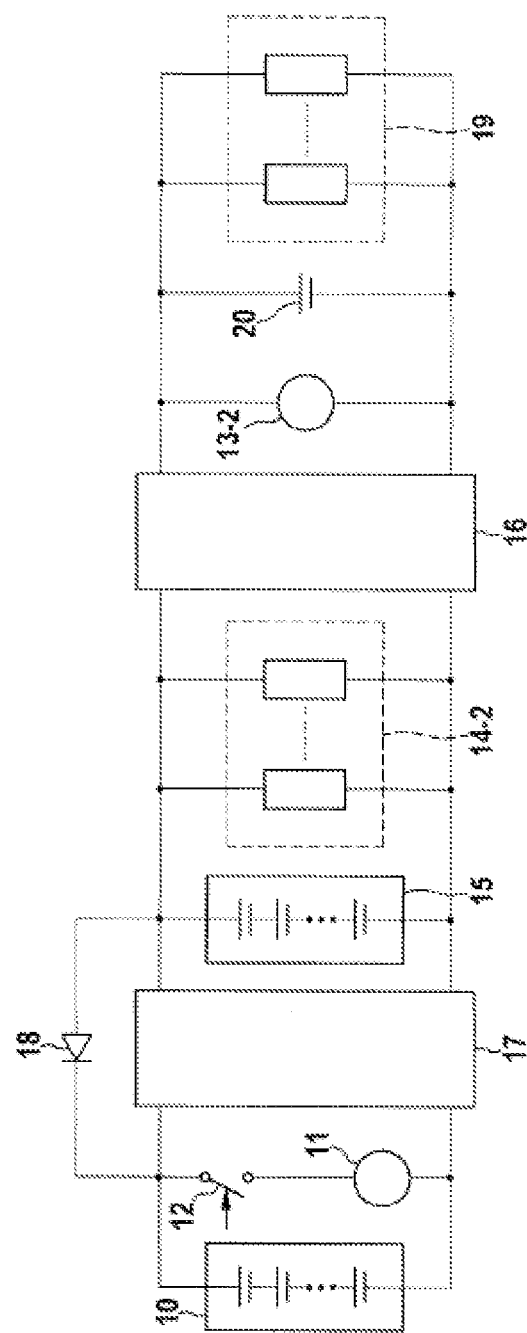

BATTERY SYSTEM FOR MICRO-HYBRID VEHICLES COMPRISING HIGH-EFFICIENCY CONSUMERS

This application is a 35 U.S.C. §371 National Stage Application of PCT/EP2011/050673, filed on Jan. 19, 2011, which claims the benefit of priority to Serial No. DE 10 2010 001 243.2, filed on Jan. 27, 2010 in Germany, the disclosures of which are incorporated herein by reference in their entirety.

The disclosure relates to battery systems for motor vehicles, which battery systems supply a uniform operating voltage to a large number of different electrical consumers. The disclosure also relates to a motor vehicle having a corresponding battery system.

BACKGROUND

A so-called on-board electrical system, which is operated as standard at 14 V, is provided in motor vehicles comprising internal combustion engines for the purpose of supplying power to the electric starter for the internal combustion engine and other electrical apparatuses of the motor vehicle (see FIG. 1). During starting of the internal combustion engine (not illustrated), a voltage which is dependent on the state of charge of a starter battery 10 which is provided for supplying power is made available to a starter 11, which starts the internal combustion engine (in the example of FIG. 1: when the switch 12 is closed by a corresponding starter signal), by means of the on-board electrical system. If the internal combustion engine is started, said internal combustion engine drives an electrical generator 13-1 ("alternator") which then generates a voltage of approximately 14 V and makes said voltage available to the various electrical consumers 14-1 in the motor vehicle by means of the on-board electrical system. In the process, the electrical generator 13-1 also recharges the starter battery 10 which is subject to loading as a result of the starting process.

So-called micro-hybrid motor vehicles can be expected to become widespread in the near future. In contrast to "pure" hybrid motor vehicles, this class of motor vehicles has only an internal combustion engine for driving purposes. Nevertheless, apparatuses for recovering kinetic energy (recuperation), for example during braking, are provided, but the energy recovered in electrical form in the process is not used for driving purposes but, amongst other things, for an automatic start/stop system and other electrical subsystems, in order to have to use the electrical generator which is operated by the internal combustion engine as seldom as possible, this reducing the loading on the internal combustion engine and therefore fuel consumption by said internal combustion engine.

However, micro-hybrid motor vehicles which are already in series production today have massive problems in respect of the service life of the lead-acid batteries which are usually used since they are subject to a considerable additional charge throughput compared to classical motor vehicles. The reason for this is that the electrical consumers have to be supplied with power by the battery during the stop phases in which the internal combustion engine is switched off. Secondly, the battery which is more rapidly discharged in this way is recharged during the relatively short phases of recuperation, this again constituting loading of the battery. This leads to the batteries in micro-hybrid vehicles sometimes not reaching a service life of two years. Frequent replacement of a battery leads to problems in respect of the reliability of the motor vehicles and annoys customers.

A further problem in motor vehicles which are equipped to current standards is that it is problematical to supply power to high-power electrical consumers, for example electrical air-conditioning compressors or electrical heating systems, with an on-board electrical system which is operated at 14 V because, on account of the relatively low voltage, said consumers have to be fed with very high currents in order to be able to provide the required power.

SUMMARY

A first aspect of the disclosure introduces a battery system for a motor vehicle comprising an internal combustion engine, wherein the battery system has at least a starter circuit, a low-voltage on-board electrical system and an on-board electrical system with an increased voltage. The starter circuit has a starter battery and a starter which is connected or can be connected to the starter battery and is designed to start the internal combustion engine in response to a starter signal. The low-voltage on-board electrical system has an on-board electrical system battery, which is designed to generate a first voltage and to output a first voltage to the low-voltage on-board electrical system, and at least one electrical consumer. The on-board electrical system with an increased voltage has at least one electrical generator which can be operated by the internal combustion engine and is designed to generate a second voltage, which is higher than the first voltage, and to output a second voltage to the on-board electrical system with an increased voltage. The on-board electrical system with an increased voltage is connected to the low-voltage on-board electrical system by means of a first coupling unit which is designed to draw electrical energy from the on-board electrical system with an increased voltage and to supply electrical energy to the low-voltage on-board electrical system. The low-voltage on-board electrical system is connected to the starter circuit by means of a second coupling unit which is designed to draw electrical energy from the low-voltage on-board electrical system and to supply electrical energy to the starter circuit.

In an on-board electrical system or battery system according to the disclosure, the battery used has a relatively long service life and it is better suited for feeding high-power consumers.

The disclosure has the advantage that electrical consumers which are designed for a low (first) voltage can also be operated by the low-voltage on-board electrical system. However, the on-board electrical system with an increased voltage is available for high-power consumers, this on-board electrical system being able to supply relatively low currents to the high-power consumers on account of the relatively high third voltage. In addition, the starter circuit is disconnected from the low-voltage on-board electrical system, and the starter circuit and the low-voltage on-board electrical system each have their own battery, the starter battery on the one hand and the on-board electrical system battery on the other hand. As a result, the low-voltage on-board electrical system is stabilized and rendered relatively less sensitive to the frequent starting processes caused by the automatic start/stop system of the micro-hybrid vehicle. Therefore, in particular, the voltage of the low-voltage on-board electrical system will not dip or will dip to at least a considerably lesser extent during starting, this ensuring that the electrical consumers which are operated in the low-voltage on-board electrical system function in a fault-free and therefore reliable manner.

According to the disclosure, the electrical generator is arranged in the on-board electrical system with an increased voltage and supplies electrical energy to said on-board electrical system after the internal combustion engine is started, it also being possible for at least some of this electrical energy to be supplied to the low-voltage on-board electrical system for the purpose of charging the starter battery. In this case, the arrangement of the electrical generator in the on-board electrical system with an increased voltage has the advantage that the electrical energy is generated in the on-board electrical system with an increased voltage, the consumers with the greatest power consumption also being arranged here. Only a small portion of the electrical energy has to be supplied to the low-voltage on-board electrical system by means of the coupling unit, this improving the degree of efficiency of the entire arrangement. The starter circuit again has a separate battery (the starter battery) which can supply the large currents necessary for starting to the starter without disruptive intermediate components.

A battery system in which the starter battery and/or the on-board electrical system battery is/are a lithium-ion battery is particularly preferred. Lithium-ion batteries can store a larger amount of energy in a given volume than, for example, lead-acid batteries. In this case, it is particularly advantageous for the second coupling unit to supply electrical energy from the low-voltage on-board electrical system to the starter circuit after the internal combustion engine is started and thus to function as a charging device for the starter battery. In this preferred embodiment of the disclosure, the starter battery must be charged in a special way because it is designed as a lithium-ion battery and is therefore sensitive to overvoltages. A further advantage of lithium-ion batteries is that they can cope with a large number of charging cycles and therefore can increase the reliability of a micro-hybrid motor vehicle.

The on-board electrical system with an increased voltage can have at least one high-power consumer, for example an electrical air-conditioning compressor, an electrical heating system or an electric motor. The at least one electrical consumer of the low-voltage on-board electrical system can be, for example, a music system, a navigation device or an electric window winder.

A diode is provided in an advantageous embodiment of the disclosure, the anode of said diode being connected to the low-voltage on-board electrical system and the cathode of said diode being connected to the starter circuit. If the voltage in the starter circuit dips on account of the high loading during starting of the internal combustion engine, the diode will automatically begin to conduct current and stabilize the voltage of the starter circuit by connecting the on-board electrical system battery parallel to the starter battery. Since the diode can carry a considerably greater current than the second coupling unit, the second coupling unit would not be able to stabilize the voltage in the starter circuit as desired.

The on-board electrical system with an increased voltage preferably has a buffer capacitor which smooths the second voltage, which is generated by the electrical generator, in the on-board electrical system with an increased voltage.

The first coupling unit and/or the second coupling unit are preferably DC/DC converters.

The first voltage can be between 10 V and 15 V. This voltage range guarantees compatibility with a large number of electrical systems which are available in motor vehicle construction. The first voltage is preferably also provided for the starter circuit for the same reason.

The second voltage is preferably between 24 V and 45 V. This voltage range allows the necessary electrical power to be supplied to high-power consumers in a simplified manner, but without raising the voltage to such an extent that, in the event of repair, servicing personnel or, in the event of an accident, rescue personnel or vehicle occupants are put at risk due to high voltages. The second voltage being approximately between two times and three times the magnitude of the first voltage additionally means that the on-board electrical system with an increased voltage can be coupled to the low-voltage on-board electrical system in a simple manner and the second voltage can be converted into the first voltage with a high degree of efficiency.

A second aspect of the disclosure relates to a motor vehicle comprising an internal combustion engine and a battery system according to the first aspect of the disclosure. The motor vehicle is preferably designed as a micro-hybrid motor vehicle.

BRIEF DESCRIPTION OF THE DRAWINGS

The disclosure will be explained in greater detail below with reference to figures of exemplary embodiments. In the figures, identical or similar reference symbols identify identical or similar elements, and in said figures:

FIG. 2 shows an exemplary embodiment of the battery system according to the disclosure.

DETAILED DESCRIPTION

Figure 1:
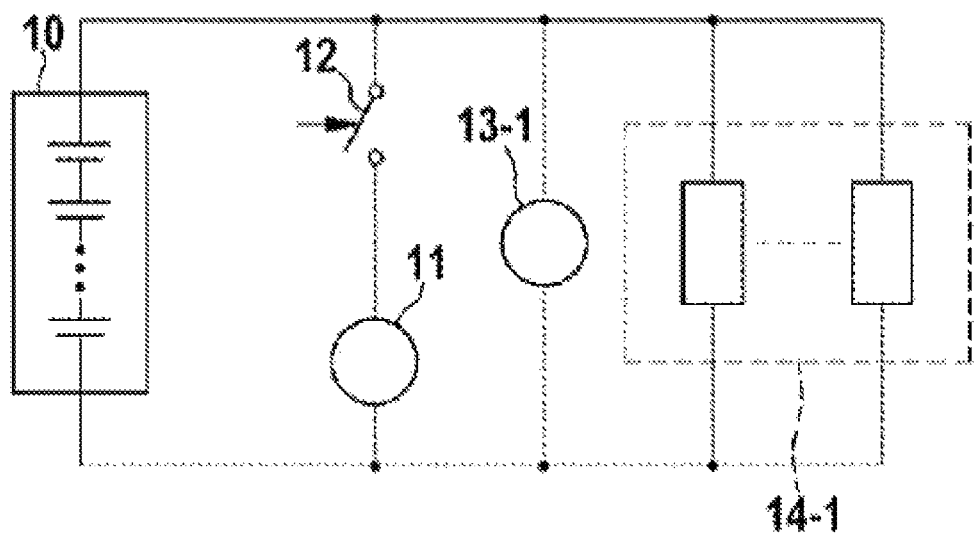
FIG. 1 shows a battery system according to the prior art.

FIG. 2 shows an exemplary embodiment of the battery system according to the disclosure. A starter battery 10, which is preferably designed as a lithium-ion battery, supplies a voltage of preferably 10 V to 15 V to a starter circuit, wherein the exact voltage is dependent on the state of charge of the starter battery 10. A starter 11 is connected to the starter battery 10, said starter being designed to start an internal combustion engine (not illustrated). A switch 12, which is controlled by a starter signal, is connected in series with the starter 11. If the switch 12 is closed, the starter 11 is activated and a current flows from the starter battery 10 through the starter 11. With preference, no further electrical consumers are provided parallel to the starter 11, in order to not additionally load the starter battery 10. The starter circuit is connected to a low-voltage on-board electrical system by means of a coupling unit 17 which is designed as a DC/DC converter in the example. The coupling unit 17 is designed to draw electrical energy from the low-voltage on-board electrical system and to make electrical energy available to the starter circuit, as a result of which the starter battery 10 is recharged. A diode 18 can optionally be provided, said diode connecting the low-voltage on-board electrical system to the starter circuit if the voltage in the starter circuit falls below the voltage of the low-voltage on-board electrical system.

The low-voltage on-board electrical system has its own battery, the on-board electrical system battery 15 which is preferably designed as a lithium-ion battery and is designed to generate a voltage of preferably 10 V to 15 V. At least one electrical consumer 14-2 is also provided in the low-voltage on-board electrical system, said electrical consumer being designed for operation at the voltage of 10 V to 15 V. Examples of electrical consumers of this kind may be a music system, a navigation device, electric window winders and the like. The low-voltage on-board electrical system is connected to an on-board electrical system with an increased voltage by means of a further coupling unit 16 which is likewise designed as a DC/DC converter in the example. The on-board electrical system with an increased voltage is supplied by an electrical generator 13-2, said electrical generator being operated by the (started) internal combustion engine and being designed to generate a voltage of preferably 24 V to 45 V. The further coupling unit 16 is designed to draw electrical energy from the on-board electrical system with an increased voltage and to supply electrical energy to the low-voltage on-board electrical system, as a result of which the on-board electrical system battery 15 is charged and the power required for the operation of the at least one electrical consumer 14-2 is made available. In contrast, the on-board electrical system with an increased voltage contains electrical consumers of the kind which consume a relatively high electrical power and therefore are operated in a relatively simple manner by a relatively high voltage which is generated, according to the disclosure, by the electrical generator 13-2, in order to reduce the currents required. High-power consumers 19 of this kind are illustrated by way of example in FIG. 2. Said high-power consumers can be, for example, electrical air-conditioning compressors or heating systems. The on-board electrical system with an increased voltage preferably contains a device for smoothing voltages, said device having the task of smoothing the voltage which is generated by the electrical generator 13-2 and usually has a high degree of ripple. The device for smoothing voltages is preferably designed as a buffer capacitor 20.

It goes without saying that, in particular, the first coupling unit 16 and, under certain circumstances, the second coupling unit 17 as well can also be designed for the bidirectional transportation of charge. Designing the disclosure in this way allows charge to be transferred between the individual batteries or on-board electrical systems as required.

The disclosure therefore provides an on-board electrical system or battery system for a motor vehicle comprising an internal combustion engine, preferably a micro-hybrid motor vehicle, which on-board electrical system or battery system is better suited to feeding high-power consumers and has a higher degree of reliability than solutions according to the prior art.

The invention claimed is:

1. A battery system for a motor vehicle having an internal combustion engine, the battery system comprising:
   a starter circuit comprising a starter battery and a starter which is connected or configured to be connected to the starter battery and is designed to start the internal combustion engine in response to a starter signal;
   a low-voltage on-board electrical system comprising an on-board electrical system battery which is designed to generate a first voltage and to output a first voltage to the low-voltage on-board electrical system, and at least one electrical consumer; and
   an on-board electrical system with an increased voltage comprising at least one electrical generator which is configured to be operated by the internal combustion engine and is designed to generate a second voltage, which is higher than the first voltage, and to output the second voltage to the on-board electrical system with an increased voltage,
   wherein the on-board electrical system with an increased voltage is connected to the low-voltage on-board electrical system by a first coupling unit which is designed to draw electrical energy from the on-board electrical system with an increased voltage and to supply electrical energy to the low-voltage on-board electrical system, and
   wherein the low-voltage on-board electrical system is connected to the starter circuit by a second coupling unit which is designed to draw electrical energy from the low-voltage on-board electrical system and to supply electrical energy to the starter circuit.

2. The battery system as claimed in claim 1, in which the starter battery is and/or the on-board electrical system battery is/are designed as a lithium-ion battery.

3. The battery system as claimed in claim 1, in which the on-board electrical system with an increased voltage has at least one high-power consumer.

4. The battery system as claimed in claim 1, in which the at least one electrical consumer of the low-voltage on-board electrical system is one of a music system, a navigation device and an electric window winder.

5. The battery system as claimed in claim 1, further comprising a diode having an anode and a cathode, the anode of said diode being connected to the low-voltage on-board electrical system and the cathode of said diode being connected to the starter circuit.

6. The battery system as claimed in claim 1, in which the on-board electrical system with an increased voltage has a buffer capacitor.

7. The battery system as claimed in claim 1, in which the first coupling unit and/or the second coupling unit are DC/DC converters.

8. The battery system as claimed in claim 1, in which the first voltage is between 10 V and 15 V.

9. The battery system as claimed in claim 8, in which the second voltage is between 24 V and 45 V.

10. A motor vehicle, comprising:
    an internal combustion engine; and
    a battery system including:
       a starter circuit comprising a starter battery and a starter which is connected or configured to be connected to the starter battery and is designed to start the internal combustion engine in response to a starter signal;
       a low-voltage on-board electrical system comprising an on-board electrical system battery which is designed to generate a first voltage and to output a first voltage to the low-voltage on-board electrical system, and at least one electrical consumer; and
       an on-board electrical system with an increased voltage comprising at least one electrical generator which is configured to be operated by the internal combustion engine and is designed to generate a second voltage, which is higher than the first voltage, and to output the second voltage to the on-board electrical system with an increased voltage,
       wherein the on-board electrical system with an increased voltage is connected to the low-voltage on-board electrical system by a first coupling unit which is designed to draw electrical energy from the on-board electrical system with an increased voltage and to supply electrical energy to the low-voltage on-board electrical system, and
       wherein the low-voltage on-board electrical system is connected to the starter circuit by a second coupling unit which is designed to draw electrical energy from the low-voltage on-board electrical system and to supply electrical energy to the starter circuit.

11. The battery system as claimed in claim 3, wherein the at least one high-power consumer is one of an electrical air-conditioning compressor, an electrical heating system, and an electric motor.

\* \* \* \* \*